(12) United States Patent
Kong

(10) Patent No.: US 11,211,217 B2
(45) Date of Patent: Dec. 28, 2021

(54) RELAY AND POWER BATTERY CIRCUIT USING THE SAME

(71) Applicant: WM Smart Mobility (Shanghai) Co., Ltd., Shanghai (CN)

(72) Inventor: Zhijie Kong, Shanghai (CN)

(73) Assignee: WM Smart Mobility (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/649,077

(22) PCT Filed: Sep. 18, 2018

(86) PCT No.: PCT/CN2018/106151
§ 371 (c)(1),
(2) Date: Mar. 19, 2020

(87) PCT Pub. No.: WO2019/057026
PCT Pub. Date: Mar. 28, 2019

(65) Prior Publication Data
US 2020/0273649 A1 Aug. 27, 2020

(30) Foreign Application Priority Data
Sep. 20, 2017 (CN) .......................... 201710861707.5

(51) Int. Cl.
*H01H 47/04* (2006.01)
*B60L 3/04* (2006.01)
(Continued)

(52) U.S. Cl.
CPC ............... *H01H 47/04* (2013.01); *B60L 3/04* (2013.01); *H01H 50/16* (2013.01); *H01H 51/04* (2013.01); *H01M 10/44* (2013.01); *H02M 7/42* (2013.01)

(58) Field of Classification Search
CPC .... H01H 47/325; H01H 47/002; H01H 47/22; H01H 47/32; H01H 47/04; H01H 47/02;
(Continued)

(56) References Cited

U.S. PATENT DOCUMENTS

| | | | |
|---|---|---|---|
| 2011/0187127 A1* | 8/2011 | Murata | F02N 15/067 290/38 C |
| 2012/0013182 A1* | 1/2012 | Minegishi | B60K 6/365 307/9.1 |

(Continued)

*Primary Examiner* — Bryan R Perez
(74) *Attorney, Agent, or Firm* — Snell & Wilmer L.L.P.

(57) ABSTRACT

A relay for a high voltage circuit comprises a main coil and a first armature, wherein the first armature is located in the high voltage circuit and is correspondingly in a position to open and close the high voltage circuit in response to power down and power up of the main coil; a secondary coil that cooperates with the first armature and a driving circuit that supplies power to the secondary coil, wherein the driving circuit is powered by a high voltage supply of the high voltage circuit, the secondary coil is powered up to generate additional electromagnetic force that places the first armature in the closed position when the driving circuit is closed; and a second armature located in the driving circuit, and is correspondingly in a position to open or close the driving circuit in response to power down and power up of the main coil.

10 Claims, 3 Drawing Sheets

(51) Int. Cl.
*H01H 50/16* (2006.01)
*H01H 51/04* (2006.01)
*H01M 10/44* (2006.01)
*H02M 7/42* (2006.01)

(58) Field of Classification Search
CPC .... H01H 47/226; H02H 7/085; H01F 7/1805; H01F 7/1844
USPC .................................................. 361/160, 139
See application file for complete search history.

(56) References Cited

U.S. PATENT DOCUMENTS

2015/0097375 A1* 4/2015 Qin ...................... F02N 11/0851
290/38 A
2016/0148768 A1* 5/2016 Wang ...................... H01H 47/22
361/194

\* cited by examiner

Charge

Discharge

RELAY AND POWER BATTERY CIRCUIT USING THE SAME

CROSS-REFERENCE TO RELATED APPLICATIONS

This application is a national stage entry of International Patent Application No. PCT/CN2018/106151, filed Sep. 18, 2018 and entitled "RELAY AND POWER BATTERY CIRCUIT USING THE SAME," which claims priority to Chinese Patent Application No. 201710861707.5, filed Sep. 20, 2017 and entitled "RELAY AND POWER BATTERY CIRCUIT ADOPTING SAME," the disclosures of which are hereby incorporated by reference.

TECHNICAL FIELD

The present invention relates to a field of electric power design, in particular to a relay for a high voltage circuit and a power battery circuit using the relay.

BACKGROUND

At present, power battery relays used in most all-electric vehicles on the market are driven by 12V low voltage systems. The basic principle is that a relay and a pre-charge resistor are connected in series/parallel, in a high voltage circuit of the battery, to achieve high voltage power-on and power-off. A circuit diagram is shown in FIG. 1.

As shown in the figure, in the entire system, three relays are driven by a low voltage supply, generally a 12V power supply on the vehicle. A major problem with the system is that it cannot cope with fluctuations in the supplied low voltage.

Many accessories of electric vehicles are powered by the 12V low voltage, such as air-conditioning compressors, steering assistance, cooling fans, lighting, wipers, etc. Working conditions of these electrical appliances are often in dynamic changes, resulting in unstable demand for the 12V low voltage supply, which may cause a sharp drop in voltage under certain extreme working conditions. Once the voltage drops below a threshold, due to that provided energy cannot maintain the relay closed, the relay of the high voltage circuit will be forced to be open, causing open of the high voltage circuit. This situation will undoubtedly have a significant influence on driving safety.

Therefore, there is a need in the art for an improved relay scheme to overcome the influence of voltage fluctuations of the low voltage supply on state of the high voltage relay.

SUMMARY

A brief overview of one or more aspects is provided below to provide a basic understanding of these aspects. The summary is not an extensive overview of all of the aspects that are contemplated, and is not intended to identify key or decisive elements in all aspects. The sole purpose of the summary is to present some concepts of one or more aspects in a simplified form as a prelude to the more detailed description that is presented later.

According to an aspect of the present invention, a relay for a high voltage circuit is provided. On/off of the relay is driven by a low voltage supply. The relay comprises:

a main coil and a first armature that cooperates with the main coil, wherein coil current of the main coil is powered by the low voltage supply, the first armature is located in the high voltage circuit, and is correspondingly in a position to open and close the high voltage circuit in response to power down and power up of the main coil;

a secondary coil that cooperates with the first armature and a driving circuit that supplies power to the secondary coil, wherein the driving circuit is powered by a high voltage supply of the high voltage circuit, the secondary coil is powered up to generate additional electromagnetic force that places the first armature in the close position when the driving circuit is closed; and a second armature that cooperates with the main coil, wherein the second armature is located in the driving circuit, and is correspondingly in a position to open or close the driving circuit in response to power down and power up of the main coil.

In one embodiment, the first armature and the second armature are linked structures.

In one embodiment, number of turns of the secondary coil is designed to make the additional electromagnetic force on the first armature generated by the secondary coil smaller than total restoring force of the first armature and the second armature.

In one embodiment, number of turns of the secondary coil is designed to make the additional electromagnetic force on the first armature generated by the secondary coil greater than additional restoring force due to the second armature.

In one embodiment, electromagnetic force provided by the main coil is greater than total restoring force of the first armature and the second armature at least when the low voltage supply is at a nominal value.

In one embodiment, axis of the secondary coil is aligned with the first armature and is located by the first armature to maximize magnetic field density at the first armature when the secondary coil is powered up.

In one embodiment, winding direction of the secondary coil is designed to make the additional electromagnetic force on the first armature, generated by the secondary coil, in a direction to make the first armature in the close position both when the high voltage supply is charged and when the high voltage supply is discharged.

In one embodiment, the low voltage supply is a 12V voltage supply.

According to another aspect of the present invention, a power battery circuit is further provided, comprising:

a high voltage battery module; and an inverter, connected to the high voltage battery module via a high voltage circuit, for converting direct current of the high voltage battery module into alternating current, the high voltage circuit is deposed with the relay mentioned above, for controlling on/off of the power battery circuit, the high voltage battery module is used as the high voltage supply in the relay.

In one embodiment, the power battery circuit is used in an electric vehicle.

BRIEF DESCRIPTION OF THE DRAWINGS

The above features and advantages of the present invention will be better understood after reading the detailed description of the embodiments of the present disclosure in conjunction with the following figures. In the figures, components are not necessarily drawn to scale, and components having similar related features may have the same or similar reference numerals.

DETAILED DESCRIPTION

The present invention is described in detail below with reference to the drawings and specific embodiments. Note that aspects described below with reference to the drawings and specific embodiments are merely exemplary, and should not be construed as any limitation on the scope of protection of the present invention.

Figure 1:
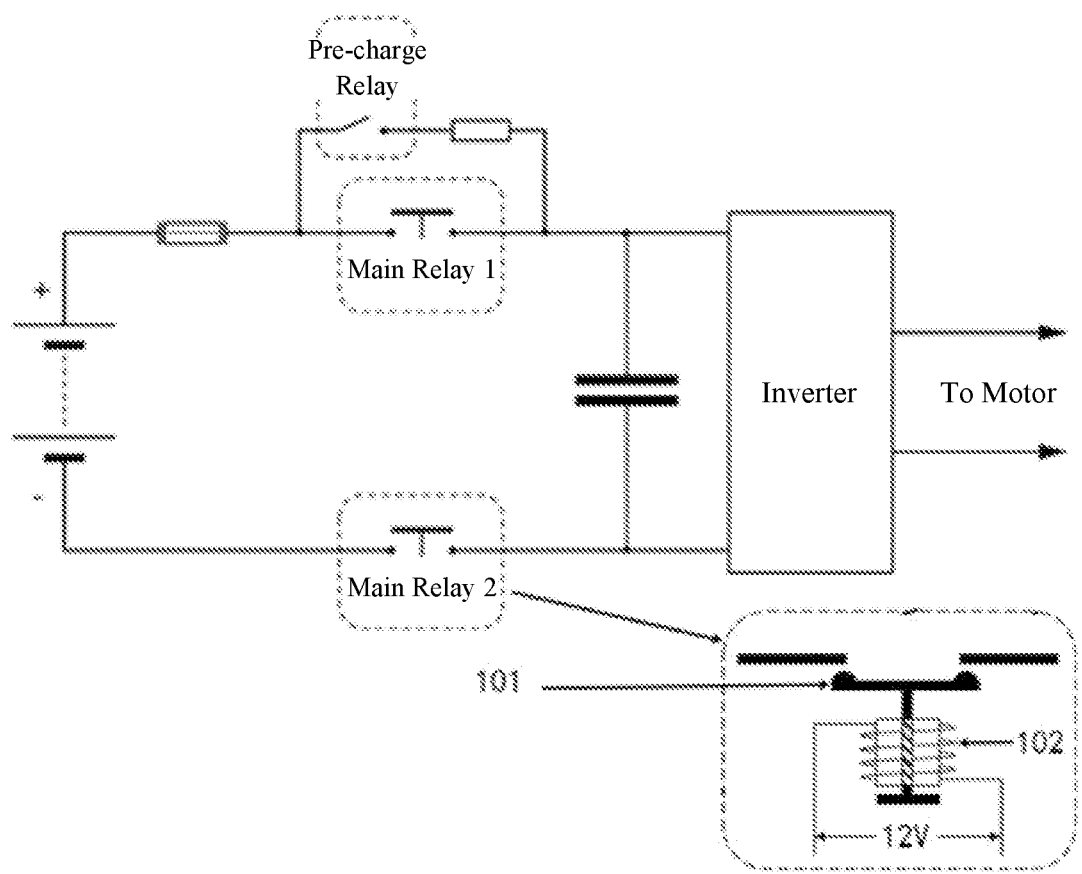
FIG. 1 shows a schematic diagram of on/off of the high-voltage circuit in a conventional power battery circuit.

As shown in FIG. 1, main components of the relay comprise an armature 101 and a coil 102 (containing an iron core). Electromagnetic force between the armature 101 and the coil 102 is used to switch on and off the relay. In detail, when there is no current in the coil, the armature 101 is maintained in an open position by a restoring force (such as generated by a spring), that is, moving contacts on the armature are separated from static contacts on a high voltage bus.

When a certain voltage is applied across the coil, a certain current will flow in the coil, thereby generating an electromagnetic effect. The armature 101 will overcome the restoring force and move to a close position under the effect of the electromagnetic force, that is, the moving contacts on the armature will be attracted to the static contacts on the high voltage bus.

When the coil is powered off again, the electromagnetic force also disappears, and the armature 101 will return to its original position under the effect of the restoring force, so that the moving contacts are released from the statics contact on the high voltage bus. The attracting and the release achieve the purpose of conducting and cutting in the circuit.

When the armature is in the close position, the electromagnetic force on the armature must be greater than the restoring force to maintain the close position. The electromagnetic force is affected by the magnitude of the coil current. As mentioned above, in the power battery circuit of an all-electric vehicle, the coil is powered by a low voltage supply (e.g. 12V voltage). At the same time, many accessories in electric vehicle such as air-conditioning compressors, steering assistance, cooling fans, lighting, wipers, etc. are powered by the same 12V voltage supply. Changes in working conditions of these electronic devices cause the 12V voltage supply to be extremely unstable and prone to fluctuate. The fluctuation of the 12V voltage supply affects the change of the coil current, and then affects the stability of the electromagnetic force. When voltage of the low voltage supply sharply drops below a threshold, since the energy cannot provide sufficient electromagnetic force to keep the relay closed, the relay of the high voltage circuit will be forced to open the relay, causing open of the high voltage circuit, thereby affecting driving safety.

In the present invention, by introducing an additional coil, additional electromagnetic force is provided when the relay is closed to keep the relay closed. The additional coil uses a high voltage electric system as an energy source to provide sufficient energy to maintain the relay closed. At the same time, for the sake of safety performance and ease of integration with conventional systems, a low voltage supply is still used as a starting power, and the low voltage supply is used as an instruction to open the relay. The proposal isolates the low voltage part and the high voltage holding part of the relay. The high voltage part is only used as a closing force enhancement. The on/off of the relay is still controlled by the low voltage part, ensuring the function of disconnecting the relay in an unexpected situation.

Figure 2:
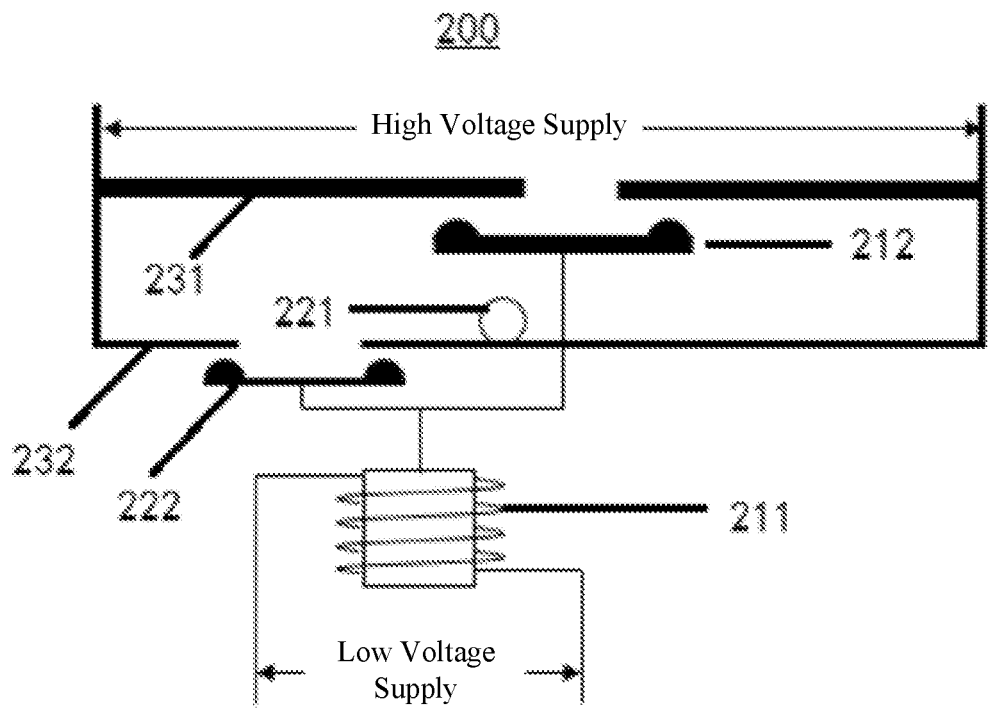
FIG. 2 shows a schematic diagram of the relay according to an aspect of the present invention.

FIG. 2 shows a schematic diagram of a relay 200 according to an aspect of the present invention. Note that FIG. 2 only shows a schematic structural diagram, and the relative positions of the components in the figure do not necessarily reflect the positional relationship between real components.

The role of the relay 200, whose on/off is driven by a low voltage supply, is to control on/off of the high voltage circuit 231. As shown in FIG. 2, the relay 200 comprises a main coil 211 and a first armature 212 that cooperates with the main coil 211.

The first armature 212 is located in the high voltage circuit 231. Electromagnetic force generated when the main coil 211 is powered up makes the first armature 212 move to a close position against a restoring force, that is, moving contacts on the first armature 212 are driven closed with static contacts on a high voltage bus. When the main coil 211 loses power, disappearance of the electromagnetic force makes the first armature 212 return to an open position due to the restoring force, that is, the moving contacts on the first armature 212 are brought to be separated from the static contacts on the high voltage bus.

As mentioned above, coils of the main coil 211 is powered by a low voltage supply. In the close state, since voltage fluctuation of the low voltage supply makes the electromagnetic force used to maintain the close of the first armature 212 fluctuate, a risk of opening the first armature 212 is caused.

For this reason, a secondary coil 221 cooperating with the first armature 212 is specially designed for the relay 200, to provide additional electromagnetic force to the first armature 212 when the first armature 212 is in the close position.

In particular, the secondary coil 221 is powered by a high voltage supply via a driving circuit 232. A second armature 222 is designed in the driving circuit 232, and on/off of the driving circuit 232 is controlled by the second armature 222 that cooperates with the main coil 211.

When the main coil 211 is powered up, generated electromagnetic force makes the second armature 222 move to a close position against a restoring force, that is, moving contacts on the second armature 222 are brought to be closed with static contacts on the driving circuit. When the main coil 211 loses power, disappearance of the electromagnetic force makes the second armature 222 return to an open position due to the restoring force, that is, the moving contacts on the second armature 212 are brought to be separated from the static contacts on the driving circuit.

In particular, the first armature 212 and the second armature 222 may be a linkage mechanism, that is, the two are moved synchronously. For example, the first armature 212 and the second armature 222 may be fixed on a same bracket, thereby achieving synchronous linkage between the two. In this way, the first armature 212 and the second armature 222 may be opened or closed in synchronization.

When the second armature 222 in the driving circuit 232 is in the close position, the secondary coil 221 is powered up, thereby generating an extra electromagnetic force, in addition to the electromagnetic force generated by the main coil 211 to the first armature 212, to maintain the first armature 212 in the close position.

In the present invention, since current of the secondary coil 221 is powered by a high voltage supply, sufficient electromagnetic force may be generated to maintain the first armature 212 closed. In addition, the power up and the power down of the secondary coil 221 is still controlled by the low voltage supply, that is, when the low voltage supply powers the main coil 211 to close the first armature 212, the close of the second armature 222 also enables the secondary coil 221 to be powered up, thereby providing auxiliary additional electromagnetic force to maintain the first armature 212 closed. On the other hand, when the first armature 212 is desired to be disconnected, as long as the low voltage supply powers off the main coil 211, the secondary coil 221 is also powered off due to disconnection of the second armature 222, so that the first armature 212 may be normally disconnected.

Generally, after the second armature 222 is added, an additional restoring force may also be generated. In the case where the first armature 212 and the second armature 222 are linked structures, in order to enhance closing ability of the first armature 212 and the second armature 222 in a close state, a number of turns of the secondary coil 221 may be designed to make the electromagnetic force, generated by the secondary coil 221 when powered up, be greater than the additional restoring force caused due to the adding of the second armature 222.

Of course, since additional restoring force may be generated after adding the second armature 222, and the secondary coil 221 cannot provide electromagnetic force when the relay 200 is switched off, in the case where the first armature 212 and the second armature 222 are linked structures, electromagnetic force provided by the main coil 211 need to be greater than total restoring force of the first armature 212 and the second armature 222 at least when the low voltage supply is at a nominal value.

In addition, in the case where the first armature 212 and the second armature 222 are linked structures, if the electromagnetic force, generated by the secondary coil 221 when powered up is too large, the first armature 212 and the second armature 222 may be kept closed due to the electromagnetic force of the secondary coil 211 when the main coil 211 loses power, so that the switching control of the relay by the low voltage supply is lost. For this reason, the number of turns of the secondary coil 221 may be designed to make the electromagnetic force, generated by the secondary coil 221 when powered up, smaller than the total restoring force of the first armature 212 and the second armature 222. Therefore, when the main coil 211 loses power, it may guarantee the opening of the first armature 212 and the second armature 222, so as to achieve the purpose of opening the relay 200.

Figure 3:
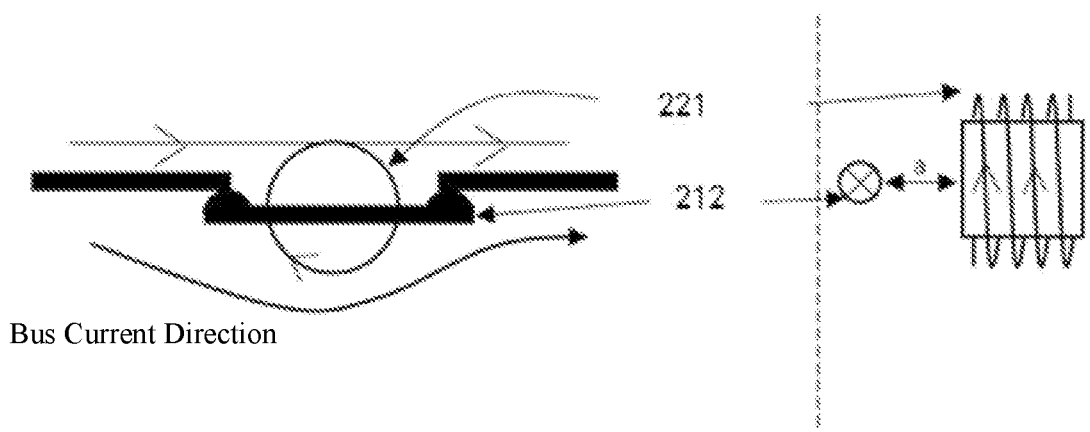
FIG. 3 shows a schematic diagram of installing the secondary coil according to an embodiment.

FIG. 3 shows a schematic diagram of installing the secondary coil. The left side of the dotted line in FIG. 3 is a front view of the installing structure of the secondary coil 221 and the first armature 212, and the right side of the dotted line is a side view.

As shown in FIG. 3, axis of the secondary coil 221 is aligned with the first armature 212, so that centre of the magnetic line of force, generated when the secondary coil 221 is powered up, passes through the first armature 212. Therefore, the electromagnetic force can be maximized. At the same time, the secondary coil 221 is located near the first armature 212. For example, as shown in the side view of FIG. 3, axial distance a of the first armature 212 and the secondary coil 221 can be as small as possible, so as to use the magnetic field generated by the secondary coil 221 as much as possible. Therefore, magnetic field density at the first armature 212 is increased.

Taking the current direction in FIG. 3 as an example, the current flowing through the first armature 212 is to right, and the direction of the magnetic field lines generated by the current direction of the secondary coil 221 is perpendicular to the paper in the front view. According to the left-hand theorem, it can be known that the upward direction of the generated Lorentz force is exactly the direction to close the first armature 212.

In addition, as mentioned above, the relay 200 may be used in a power battery circuit in an all-electric vehicle, as shown in FIG. 1. In such a power battery circuit, current in the high voltage circuit have different current directions when the high voltage battery module is charged and discharged.

In this case, in the present invention, winding direction of the secondary coil 221 is designed to make the additional electromagnetic force on the first armature 212, generated by the secondary coil 221, be in the direction to make the first armature 212 in the close position both when the high voltage supply is charged and when the high voltage supply is discharged.

Figure 4A:
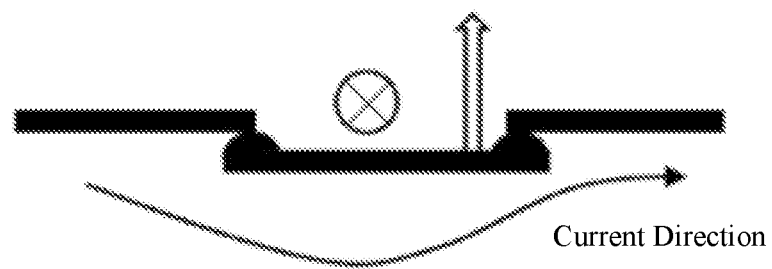
FIG. 4a shows a diagram of relationship between the first armature, the direction of magnetic field and the direction of magnetic field force during charge.
Figure 4B:
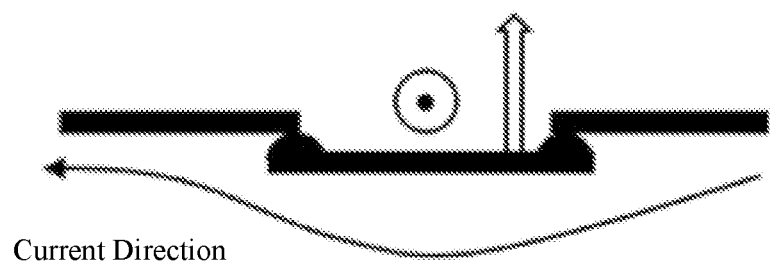
FIG. 4b shows a diagram of the relationship between the first armature, the direction of magnetic field and the direction of magnetic field force during discharge.

FIG. 4a shows a diagram of relationship between the first armature, the direction of magnetic field and the direction of magnetic field force during charge. FIG. 4b shows a diagram of the relationship between the first armature, the direction of magnetic field and the direction of magnetic field force during discharge.

As shown in FIG. 4a, when the high voltage supply is charged, the current direction in the high voltage bus is to right. At this time, the winding direction of the secondary coil 221 can be designed to make the direction of magnetic field, generated by the current provided by the high voltage supply via the driving circuit 232, perpendicular to the paper surface inward. Then, the direction of the magnetic field force generated according to the left-hand theorem is upward to close the first armature 212.

Under this design, the high voltage supply is assumed to discharge. At this time, the current direction in the high voltage bus is changed to left. At the same time, the current direction in the driving circuit 232, which is also powered by the high voltage supply, also changes, so that the current in the secondary coil 221 is also reversed. Therefore, the final magnetic field direction is changed to be perpendicular to the paper surface outward. At this time, the direction of the magnetic field force generated according to the left-hand theorem is still upward to close the first armature 212.

In the present invention, by using a same high voltage supply to powered the secondary coil 221, in a specific winding mode of the secondary coil 221, no matter the high voltage supply is discharged or charged, the Lorentz force applied to the first armature can be ensured to facilitate the closing of the relay. This is suitable for the demand of the charge and discharge scenario in a circuit that needs to be charged and discharged, such as a power battery circuit.

The present invention further provides a power battery circuit comprising the above relay, wherein the high voltage battery module is the above high voltage supply. Such a power battery circuit may be used in an electric vehicle.

The previous description of the disclosure is provided to enable any person skilled in the art to make or use the disclosure. Various modifications to the present disclosure will be obvious to those skilled in the art, and the general principles defined herein may be applied to other variations without departing from the spirit or scope of the disclosure. Thus, the present disclosure is not intended to be limited to the examples and designs described herein, but is to be accorded the broadest scope of the principles and novel features disclosed herein.

What is claimed is:

1. A relay for a high voltage circuit, wherein on/off of the relay is driven by a low voltage supply, the relay comprises:
   a main coil and a first armature that cooperates with the main coil, wherein coil current of the main coil is powered by the low voltage supply, the first armature is located in the high voltage circuit, and is correspondingly in a position to open and close the high voltage circuit in response to power down and power up of the main coil;
   a secondary coil that cooperates with the first armature and a driving circuit that supplies power to the secondary coil, wherein the driving circuit is powered by a high voltage supply of the high voltage circuit, the secondary coil is powered up, when the driving circuit is closed, to generate additional electromagnetic force that puts the first armature in the close position; and
   a second armature that cooperates with the main coil, wherein the second armature is located in the driving circuit, and is correspondingly in a position to open or close the driving circuit in response to power down and power up of the main coil.

2. The relay of claim 1, wherein the first armature and the second armature are linked structures.

3. The relay of claim 2, wherein a number of turns of the secondary coil is designed to make the additional electromagnetic force on the first armature generated by the secondary coil smaller than total restoring force of the first armature and the second armature.

4. The relay of claim 2, wherein a number of turns of the secondary coil is designed to make the additional electromagnetic force on the first armature generated by the secondary coil greater than additional restoring force caused due to the second armature.

5. The relay of claim 2, wherein electromagnetic force provided by the main coil is greater than total restoring force of the first armature and the second armature at least when the low voltage supply is at a nominal value.

6. The relay of claim 1, wherein axis of the secondary coil is aligned with the first armature and is located adjacent to the first armature to maximize magnetic field density at the first armature when the secondary coil is powered up.

7. The relay of claim 1, wherein winding direction of the secondary coil is designed to make the additional electromagnetic force on the first armature, generated by the secondary coil, be in a direction to make the first armature in the close position both when the high voltage supply is charged and when the high voltage supply is discharged.

8. The relay of claim 1, wherein the low voltage supply is a 12V voltage supply.

9. A power battery circuit, comprising:
   a high voltage battery module; and
   an inverter, connected to the high voltage battery module via a high voltage circuit, for converting direct current of the high voltage battery module into alternating current,
   the high voltage circuit is deposed with the relay according to claim 1, for controlling on/off of the power battery circuit, the high voltage battery module is used as the high voltage supply in the relay.

10. The power battery circuit of claim 9, wherein the power battery circuit is used in an electric vehicle.

* * * * *